(12) United States Patent
Wang et al.

(10) Patent No.: US 8,566,835 B2
(45) Date of Patent: Oct. 22, 2013

(54) DYNAMICALLY RESIZING A VIRTUAL MACHINE CONTAINER

(75) Inventors: Zhikui Wang, Fremont, CA (US); Xue Liu, Palo Alto, CA (US); Alex Zhang, San Jose, CA (US); Christopher Stewart, Rochester, NY (US); Xiaoyun Zhu, Cupertino, CA (US); Terence Kelly, Mountain View, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 12/263,425

(22) Filed: Oct. 31, 2008

(65) Prior Publication Data

US 2009/0158275 A1 Jun. 18, 2009

Related U.S. Application Data

(60) Provisional application No. 61/007,768, filed on Dec. 13, 2007.

(51) Int. Cl.
*G06F 9/46* (2006.01)
(52) U.S. Cl.
USPC .......................................... 718/104; 718/105
(58) Field of Classification Search
None
See application file for complete search history.

(56) References Cited

U.S. PATENT DOCUMENTS

| | | | |
|---|---|---|---|
| 5,442,730 A * | 8/1995 | Bigus | 706/19 |
| 6,662,221 B1 | 12/2003 | Gonda et al. | |
| 7,676,578 B1 | 3/2010 | Zhu et al. | |
| 7,680,916 B2 * | 3/2010 | Barnett et al. | 709/223 |
| 7,720,955 B1 | 5/2010 | Kelly | |
| 2003/0014524 A1 | 1/2003 | Tormasoz | |
| 2003/0028624 A1 | 2/2003 | Rochkind et al. | |
| 2004/0143664 A1 * | 7/2004 | Usa et al. | 709/226 |
| 2005/0091310 A1 | 4/2005 | Salomon | |
| 2005/0240558 A1 | 10/2005 | Gil et al. | |
| 2007/0043860 A1 | 2/2007 | Parbai | |
| 2007/0074191 A1 | 3/2007 | Geisinger | |
| 2007/0110077 A1 | 5/2007 | Takashig et al. | |

OTHER PUBLICATIONS

U.S. Appl. No. 11/492,353, filed Jul. 25, 2006, 1st inventor: Zhikui Wang, Abandoned.

* cited by examiner

*Primary Examiner* — Jennifer To
*Assistant Examiner* — Wissam Rashid

(57) ABSTRACT

Embodiments of the present invention pertain to dynamically resizing a virtual machine container. According to one embodiment, an optimal utilization is determined based on a desired performance for a multi-tiered application and transaction mix information that describes a mix of transactions that result from executing the multi-tiered application. Automatic modification of an amount of a physical resource a virtual machine container is entitled to for executing a particular application component associated with the multi-tiered application is enabled where the amount is automatically modified based on the optimal utilization.

12 Claims, 5 Drawing Sheets $$\Delta U(m) = \Delta U(m-1) + G^{FB}(P^{des} - P^m(m-1))/P^{des} \quad (1)$$

$$P^{des} = \frac{\sum_j D_j N_{ij}}{\sum_j N_{ij}} + \frac{T}{\sum_j N_{ij}} \left( \sum \frac{(U_{it}^{Uopt})^2}{1-U_{it}^{Uopt}} \right)_t \quad (2)$$

$$E_1(k) = E_1(k-1) + G_1(k)(U_1^{Copt} - C_1/(E_1(k-1))) \quad (3)$$

Where $G_1(k) = \beta C_1(k-1)/U_1^{Copt}$, $0 < \beta < 2$

FIG. 5

DYNAMICALLY RESIZING A VIRTUAL MACHINE CONTAINER

CROSS-REFERENCE TO RELATED APPLICATION

The present application claims priority from the provisional application Ser. No.61/007,768, filed Dec. 13, 2007, the contents of which are incorporated herein by reference in their entirety.

TECHNICAL FIELD

Embodiments of the present invention relate to virtual machine container resource entitlement. More specifically, embodiments of the present invention relate to dynamically resizing a virtual machine container.

BACKGROUND ART

In many of today's data centers, servers are shared across multiple applications or application components. However, current tools for allocating servers or server partitions to applications typically rely on offline capacity planning and performing a static partitioning of system resources to support these co-hosted applications. For example, each application is allocated a maximum entitlement of system resources for execution over the application's lifetime. Many times, the amount of the maximum entitlement of system resources is either based on anticipated peak load or demand profiles computed from historic data and performance models. However, the entitlement of system resources is static. For example, the entitlement of system resources is determined and used for a long period of time before being re-evaluated. This static entitlement typically results in poor utilization of system resources, which in many instances is below 20%, and does not take full advantage of demands that vary over time due to changes in operating conditions and user demands.

One solution has been to control the number of requests for services provided by a server that are admitted (also commonly known as "admission control") in order to improve the performance of requests that have already been admitted. However, this results in requests either not being admitted or in requests being dropped.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 depicts equations that are used as a part of various embodiments.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings.

While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail as not to unnecessarily obscure aspects of the present invention.

Overview

Figure 1:
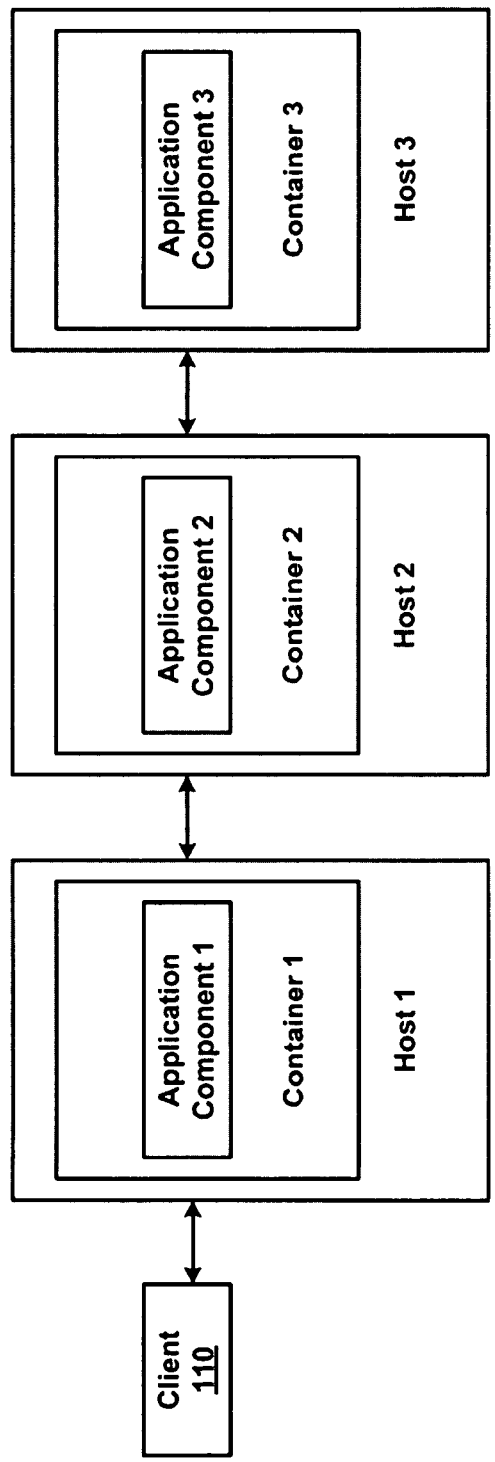
FIG. 1 depicts a block diagram of a multi-tiered application executing in a virtualized server environment, according to one embodiment.

FIG. 1 depicts a block diagram of a multi-tiered application executing in a virtualized server environment, according to one embodiment. As depicted in FIG. 1, the multi-tiered application includes 3 application components 1-3, which execute in 3 separate containers on 3 separate hosts or servers. For example, application component 1 is hosted on container 1 on host 1.

Application component 2 is hosted on container 2 on host 2 and so on. A container is also referred to as a "virtual machine container." Each application component associated with a multi-tiered application is considered to be on a "tier" of the multi-tiered application. For example, application component 1 is on one tier, application component 2 is on another tier, and application component 3 is on yet another tier.

One or more clients 110 interact with the multi-tiered application which results in a mix of transactions. For example, assume that one (application component 1) of the application components is a web server that enables a user of a client to browse items that are for sale and to order those items and another one (application component 3) of the application components is a database that stores information pertaining to those items. The transaction mix for a particular interval of time may reflect that 20 percent of the transactions pertain to ordering items, 60 percent of the transactions pertain to viewing items, and 20 percent of the transactions pertain to accessing information about the items in the database.

The "size" of a container is determined by the amount of physical resources, such as CPU, memory, storage, network bandwidth, input/output (I/O) bandwidth, that a container is entitled to, according to one embodiment. For example, a container that is entitled to 0.1 of a CPU is smaller than a container that is entitled to 0.2 of a CPU. The amount of a resource that a container is entitled to determines an upper bound on the amount of a resource that the application component associated with the container may use.

As will become more evident, various embodiments provide for determining a new entitlement that is used to resize a container for executing an application component in a multi-tiered application. Various pieces of information can be used as a part of determining a new entitlement. For example, these pieces of information may include, among other things, transaction mix information from client logs, a desired level of performance from a service level agreement, the measured performance from the perspective of a client, and the actual resources consumed by a virtual machine container.

Virtualization

Resource partitioning is a type of virtualization technology that enables multiple applications or application components to share system resources while maintaining performance isolation and differentiation among them. For example, CPUs or portions of a CPU, such as in terms of CPU cycles, may be allocated to different application components or different groups of application components. Partition sizes may be set to accommodate desired performance, such as those that are specified in service level agreements, for example. According to one embodiment, the partition sizes may vary depending on the demand for resources, as will become more evident.

In one embodiment, the resources of a resource-on-demand environment, such as a data center or a grid environment, are partitioned into containers. The containers as depicted in FIG. 1 are examples of partitions of resources. Each container includes resources that can be allocated to an application component associated with that container.

A container can be represented as a process group that includes one or more application components. There may be a limit to the amount of a particular resource (also known as "entitlement") that can be assigned to each process group. As depicted in FIG. 1, the resources of host 1 are associated with one container 1, the resources of host 2 are associated with a different container 2, and the resources of host 3 are associated with yet another container 3. However, various embodiments of the present invention are well suited to other configurations of hosts, containers and application components that are associated with a multi-tiered application. In a first example, assume that there is second multi-tiered application that includes application components A, B and C associated with containers A', B' and C'. Application component A and container A' could reside on host 1, application component B and container B' could reside on host 2 and application component C and container C' could reside on host 3. The resources associated with a host can be partitioned among the containers associated with that host. Continuing the example, the CPUs associated with host 1 can be partitioned between container 1 and container A', the CPUs associated with host 2 can be partitioned between container 2 and container B', and so on. In a second example, although the multi-tiered application depicted in FIG. 2 includes 3 application components, a multi-tiered application may include 2 or more application components. In a third example, one or more of the application components associated with a multi-tiered application may reside on the same host.

Different types of process groups, such as PSET and fair share scheduler (FSS), may be used. An integer number of CPUs can be allocated for PSET type process groups. A percentage of CPU cycles can be allocated to an FSS type process group. In one embodiment, a Hewlett-Packard™ HP-UX Process Resource Manager (PRM) is used as an FSS.

In another embodiment, the hosts are partitioned into virtual machines. For example, each container may include a virtual machine where a set of resources are allocated to each virtual machine. Virtual machines provide a technology to implement resource virtualization that allows multiple heterogeneous operating system instances to share a single physical workstation or server. Like a process group, each virtual machine receives an allocation of resources, such as a percentage of CPU capacity, memory capacity, network bandwidth, etc. In yet another embodiment, a container may include a server group.

Clients and Hosts

Examples of a client include but are not limited to a Personal Computer (PC), a Personal Digital Assistant (PDA), a wireless terminal, a cellular telephone, or any other type of well known client device. The client may include servers which may be in different data centers. A host can be any computer, such as a personal computer, a server, etc. . . . that is capable of providing one or more virtual machine containers.

Transaction Mix Information

The transaction mix affects the amount and type of physical resources that an application component associated with a container would use. For example, a transaction mix that leans more toward computing orders may be more CPU intensive whereas a transaction mix that leans more toward accessing the database may require more I/O resources. According to one embodiment, the amount of physical resources allocated to a virtual machine container is based at least in part on transaction mix information that describes the mix of transactions that result from executing a multi-tiered application.

Frequently, clients store information that describes a mix of transactions (also referred to herein as "transaction mix information") in logs. Transaction mix information, according to one embodiment, describes a mix of transactions in terms of intensity and types of transactions. Intensity may involve the number of users or transactions, for example, during a period of time. Examples of transaction types include but are not limited to accessing, storing, viewing, buying and so on.

Transaction mix information for a particular interval of time may reflect that there are 300 transactions executed in that interval of time, where 20 percent of the transactions pertain to ordering items, 60 percent of the transactions pertain to viewing items, and 20 percent of the transactions pertaining to accessing information about the items in the database.

Performance

Various performance metrics, such as mean response time, can be used as a part of specifying a desired level of performance (referred to herein as "desired performance") and as a part of measuring the actual performance (referred to herein as "measured performance"). The desired performance may be a service level objective that is specified in a service level agreement for example between a customer and a service provider. One example of a performance metric is response time, for example, of a client that requests transactions from the multi-tiered application. The measured response time may be a mean response time. Other examples of performance metrics include but are not limited to percentile of response time samples, throughput, and loss rate. Many of the examples of embodiments discussed herein assume that performance is response time.

The service provider may own a data center or a grid environment that provides for example hosts, various resources, and application components using virtualization techniques. The difference between the desired performance and the measured performance provides an indication of how closely a service provider is meeting the desired performance. According to one embodiment, the difference between the desired performance and the measured performance is used as a part of resizing a container, as will become more evident. The difference, according to one embodiment, is expressed in terms of response time (ΔP).

FIG. 5 depicts various equations that are used as a part of various embodiments. The equations 1-3 depicted on FIG. 5 refer to various sampling intervals m, i and k. According to one embodiment, Equations 1-3 each use their own sampling intervals m, i, and k. According to one embodiment, k<<m<<i. For example, k, m, and i may be set respectively at 10, 30 and 90 seconds. In the equations, k, m, and i refer to a current sampling interval and k-1, m-1, and i-1 refer to a previous sampling interval.

Entitlement, Consumption and Utilization

Entitlement, according to one embodiment, is the amount of resources that a container is entitled to use. Consumption, according to one embodiment, is the amount of resources that a container actually uses. A container may not be allowed to consume more resources than it is entitled to, according to one embodiment.

According to one embodiment, utilization is a ratio of consumption over entitlement (U=C/E). For example, if a container is entitled to 1 CPU and the container is using 0.1 of that one CPU, the utilization is 10 percent (0.1/1.0). Assume for the sake of illustration that the optimal utilization is 50 percent. In this case, the entitlement of the container may be modified from 1 CPU to 0.2 CPU in order to cause the actual utilization (0.1/0.2) to match the optimal utilization. Assume for the sake of illustration that the consumption goes up to 0.2. In this case, the actual utilization will be 100 percent (0.2/0.2). The entitlement can be modified to 0.4 so that the actual utilization (0.2/0.4) again matches the optimal utilization. Assume that the consumption drops to 0.1 and the optimal utilization drops to 10 percent. The entitlement can be modified to 1 CPU so that the actual utilization (0.1/1.0) matches the optimal utilization. The discussion of various embodiments shall use the letters E, C, and U respectively to refer to entitlement, consumption and utilization.

Figure 2:
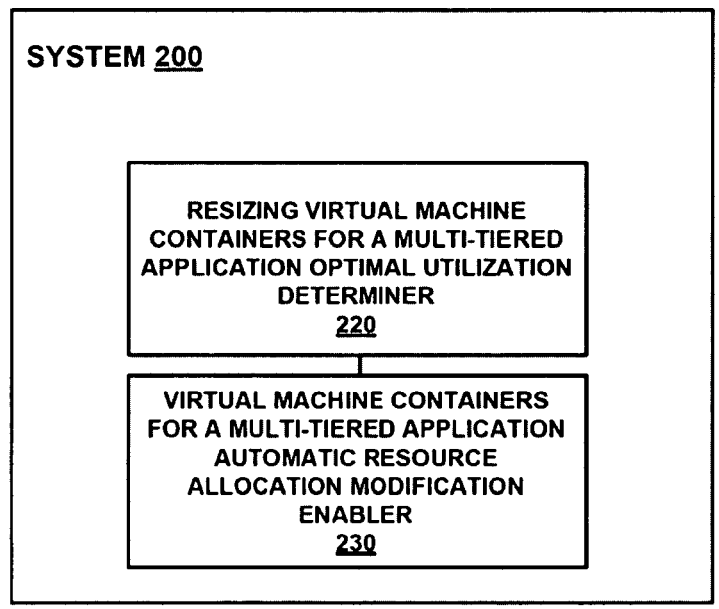
FIG. 2 is a block diagram of a system for dynamically resizing a virtual machine container, according to one embodiment.

According to one embodiment, a transaction-mix-based queuing model as represented by equation 2 is used for a multi-tiered application. For the sake of simplicity in illustrating equation 2, assume that each tier of the multi-tiered application hosts an application component in a single virtual machine container and each container receives a capped resource entitlement. The utilization of each container is defined as a ratio of average consumption and entitlement. Equation 2 can be solved for an uncorrected optimal utilization $U^{Uopt}$. Referring to FIG. 2, $N_{ij}$ is the number of transactions of type j in interval i. $U_{it}^{Uopt}$ is the uncorrected optimal utilization for a tier t. T is a sampling interval length, and $\alpha_j$ represents the sum of service times for transaction type j across all tiers plus fixed delays such as network switching and transmission delays. For example, given the total service time $\alpha_j$ of each transaction type j, transaction mix $N_{ij}$ in the interval i, and desired performance $P^{des}$, equation 2 can be solved for the expected utilization target of each tier, $U_{it}^{Uopt}$.

In real-time control, the transaction mix in the current interval may not be known before control is actuated. According to one embodiment, these values are estimated based on historical data. Different approaches may be used. For example, transaction mix information from the last interval may be used to estimate for the current interval.

In order to avoid multiple possible solutions for $U^{Uopt}$, according to one embodiment, equation 2 is solved for a single $U^{Uopt}$ for all application components associated with a multi-tiered application. According to another embodiment, equation 2 is solved for a different $U^{Uopt}$ for each application component associated with a multi-tiered application. For example, the performance utilization of the multiple tiers can be optimized such that the total cost of the resources is minimized, for example, using the equation f(E1, E2, E3).

Since models may not be totally correct all of the time, the results from equation 2 shall be referred to as an uncorrected optimal utilization $U^{Uopt}$. According to one embodiment, the correction term ΔU (refer to equation 1), which was determined based on the difference between the desired performance and the measured performance, is used to correct the $U^{Uopt}$ resulting in a corrected optimal utilization $U^{Copt}$, i.e., $U^{Copt} = U^{Uopt} + \Delta U$.

Equation 1 depicted on FIG. 5 is used, according to one embodiment, to determine the correction term ΔU(m) based on the difference between the desired performance and the measured performance where m is a control interval. The difference, according to one embodiment, is expressed in terms of the normalized error, $(P^{des} - P^m(m-1))/P^{des}$. The $P^{des}$ refers to desired performance, $P^m$ refers to measured performance, and m is a control interval.

According to one embodiment $G^{FB}$ is 0.05. Other examples of $G^{FB}$ include but are not limited to 0.09 and 0.02. Typically, the larger that $G^{FB}$ is the more quickly adjustments will be made. According to one embodiment, if the utilization target is expressed as a percentage and therefore is in the range of [0, 1], the error term is normalized by the response time targets (assuming the performance is response time targets) so that a larger stability margin exists for a certain gain value.

Equation 3 depicted on FIG. 5, according to one embodiment, can be used to determine an entitlement for automatically modifying an amount of physical resources that a virtual machine container is entitled to. Equation 3 includes $U_1^{Copt}$, $E_1$, $C_1$, $G_1$, β and k. k represents a current interval and k-1 represents a previous interval. $U_1^{Copt}$, according to one embodiment, is determined based on $U_1^{Uopt}$ (from equation 2) and ΔU (from equation 1). The $U_1^{Copt}$ depicted in equation 3 was determined using equation 2 based on the $U_1^{Uopt}$ and the ΔU using equation 1. $E_1$ and $C_1$ represent entitlement and consumption respectively. $G_1$ can be solved using the equation that is on the second line for equation 3. β can vary from 0 to 2. According to one embodiment, β is 1.0. A smaller beta may result in slower response to changes such as in a client's workload intensity and mix. For the sake of simplicity, equation 3 depicts an entitlement $E_1$ for container 1. Equations similar to equation 3 can be used for determining entitlements $E_2$, $E_3$ for containers 2 and 3 using respective consumptions $C_2$, $C_3$ for the containers 2 and 3 and so on.

According to one embodiment, a new amount of the physical resource is determined based at least in part on a ratio of the previous amount of a physical resource that the virtual machine container was consuming over a previous amount of the physical resource that the virtual machine container was entitled to. For example, referring to equation 3, $E_1(k)$ is an example of a new amount and $E_1(k-1)$ is an example of a previous amount entitled to and $C_1(k-1)$ is an example of a previous amount consumed. $C_1/E_1(k-1)$ is an example of a measured utilization for a container in a previous interval.

Systems for Dynamically Resizing a Virtual Machine Container

FIG. 2 is a block diagram of a system 200 for dynamically resizing a virtual machine container, according to one embodiment. The system 200 includes a resizing-virtual-machine-containers-for-a-multi-tiered-application-optimal-utilization-determiner 220 and a virtual-machine-containers-for-a-multi-tiered-application-automatic-resource-allocation-modification-enabler 230. The determiner 220 is configured for determining an optimal utilization based on a desired application-level performance for a multi-tiered application and transaction mix information that describes a mix of transactions that result from executing the multi-tiered application. The enabler 230 is configured for enabling automatic modification of an amount of a physical resource a virtual machine container is entitled to for executing a particular application component associated with the multi-tiered application, wherein the amount is automatically modified based on the optimal utilization.

According to one embodiment, the determiner 220 and enabler 230 can be located on either a client or a server. Transaction mix information in logs associated with the client can be accessed by the determiner 220, for example, if the determiner resides on a client. Alternatively, information from the transaction mix information in the logs can be received by the determiner 220, for example, if the determiner 220 resides on a client or a server. The consumption of a container can be accessed by an enabler 230 that resides on a client or can be received by an enabler 230 that resides on a client or a server. According to one embodiment, system 200 may also include a correction determiner for determining $\Delta U$ (refer to equation 1 depicted on FIG. 5). The term "accessing" shall be used herein to refer to accessing data that is located locally or receiving data that is remotely located.

Figure 3:
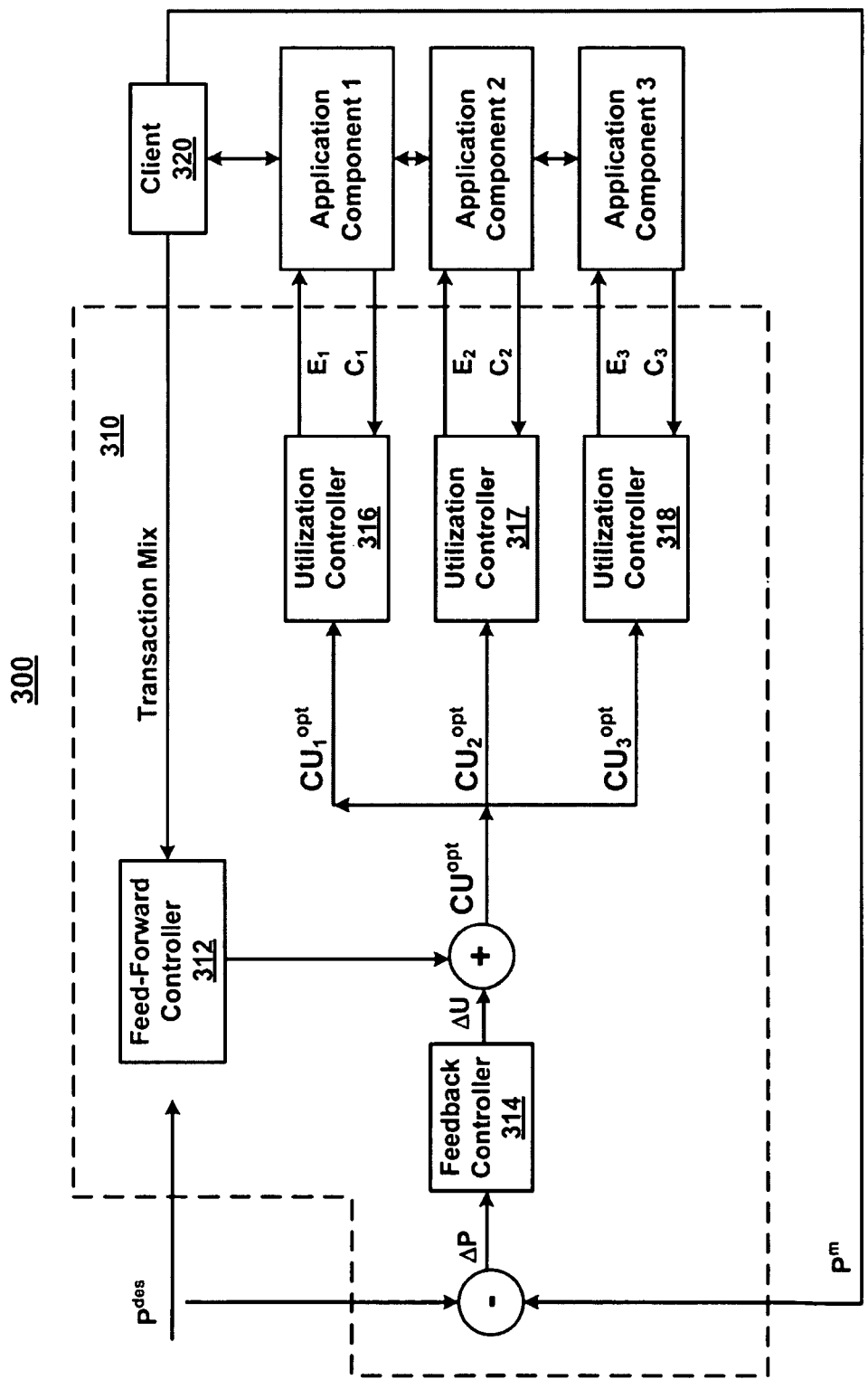
FIG. 3 is a block diagram of a system for dynamically resizing one or more virtual machine containers, according to another embodiment.

FIG. 3 is a block diagram of a system 300 for dynamically resizing one or more virtual machine containers, according to another embodiment. The system 300 includes a client 320, application components 1-3 (FIG. 1) that reside in containers 1-3 (FIG. 1), and another system 310 (also referred to herein as "Autoparam"). The system 310 includes a feed-forward controller 312, a feedback controller 314, and utilization controllers 316, 317, and 318.

The system 310 is depicted communicating with a client 320, for example, over a network. The network may be a private network such as an intranet, or a public network, such as the Internet, or a combination thereof. The system 300 may be a part of a resource-on-demand environment, such as a data center or a grid environment, which is partitioned into containers that the application components are associated with.

The determiner 220 (FIG. 2), according to one embodiment, is a part of the feed-forward controller 312. The transaction-mix-based queuing model described by equation 2 (FIG. 5) can be used for the feed-forward controller 312. The enabler 230 (FIG. 2), according to one embodiment, is a part of the utilization controllers 316, 317, 318. A correction determiner (for $\Delta U$), according to one embodiment, can be a part of the feedback controller 314.

Various pieces of information can be used as a part of determining a new entitlement (E1, E2, E3). For example, these pieces of information may include, among other things, transaction mix information from client logs, a desired level of performance ($P^{des}$), for example, from a service level agreement, the measured performance ($P^m$), for example, from the perspective of a client, and the actual resources consumed (C1, C2, C3) by a virtual machine container. These various pieces of information can be used as a part of determining, for example at the server side, optimal utilization ($U^{Uopt}$ or $U^{Copt}$ or a combination thereof) and in turn entitlement (E1, E2, E3). FIG. 3 is described in more detail below in the context of a flowchart 400 depicted on FIG. 4.

A Method of Dynamically Resizing A Virtual Machine Container

Figure 4:
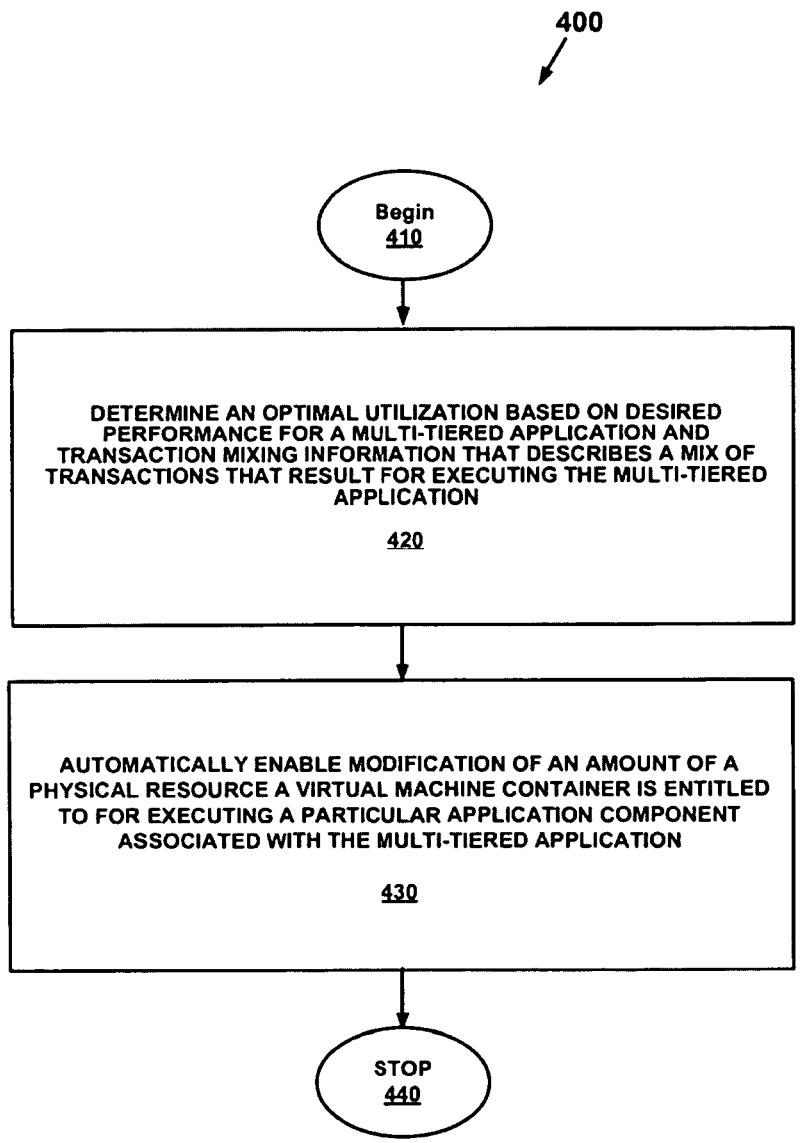
FIG. 4 is a block diagram of a flowchart that describes a method of dynamically resizing a virtual machine container, according to one embodiment.

FIG. 4 is a block diagram of a flowchart that describes a method of dynamically resizing a virtual machine container, according to one embodiment. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

All of, or a portion of, the embodiments described by flowchart 400 can be implemented using computer-readable and computer-executable instructions which reside, for example, in computer-usable media of a computer system or like device. As described above, certain processes and steps of the present invention are realized, in an embodiment, as a series of instructions (e.g., software program) that reside within computer readable memory of a computer system and are executed by the of the computer system. When executed, the instructions cause the computer system to implement the functionality of the present invention as described below.

The description of the flowchart shall refer to FIGS. 1, 3 and 5.

At step 410, the process begins.

In step 420, an optimal utilization is determined based on a desired performance for a multi-tiered application and transaction mix information that describes a mix of transactions that result from executing the multi-tiered application. For example, the feed-forward controller 312, according to one embodiment, is a queuing model as represented by equation 2. The feed-forward controller 312 receives the desired performance ($P^{des}$) from the client 320 and the transaction mix information from transaction logs associated with the client 320. The feed-forward controller 312 uses equation 2 to determine the uncorrected optimal utilization level ($U^{Uopt}$).

The feedback controller 314 receives a measured performance ($P^m$), such as a Measured Mean Response Time, from a client 320 and a desired performance ($P^{des}$), such as a desired response time from, a service level agreement. The feedback controller 314 determines the correction term ($\Delta U$) for the optimal utilization based on the difference between the measured performance ($P^m$) and the desired performance ($P^{des}$). The feedback controller 314 uses equation 1 to determine correction term ($\Delta U$) in terms of utilization.

At the + sign, a corrected optimal utilization level ($U^{Copt}$) is determined based on the uncorrected optimal utilization level ($U^{Uopt}$) and the correction term ($\Delta U$). As described herein, the corrected optimal utilization level may be the same for all of the utilization controllers 316, 317, 318 or may be different for 2 or more of the utilization controllers 316, 317, 318.

At step 430, an amount of a physical resource a virtual machine container is entitled to for executing a particular application component associated with the multi-tiered application is enabled. The amount of a physical resource is automatically modified based on the optimal utilization. For example, the utilization controllers 316-318 receive the corrected optimal utilization level(s) ($U^{Copt}$). The utilization controllers 316-318 also receive resource consumption C1, C2, C3 from respective containers 1, 2, 3 (FIG. 1) associated with the application components 1-3 (FIGS. 1 and 3). The utilization controllers 316-318 compute a new entitlement E1, E2, E3 based on equation 3. The utilization controllers 316-318 communicate the respective entitlements E1, E2, E3 to the containers 1-3. The amount of physical resources allocated to the containers 1-3 is modified based on the entitlements E1, E2, E3 that the containers 1-3 receive from the utilization controllers 316-318.

The one or more new entitlements E1, E2, E3 are determined automatically and enable automatic modification of the amount of physical resources that a virtual machine container 1-3 is entitled to.

Therefore, various embodiments enable automatically and dynamically resizing a virtual machine container so that virtual machine containers are not required to be statically partitioned. Further, various embodiments enable automatically and dynamically resizing a virtual machine container without requiring admission control.

At 440, the process stops.

Experimental Evaluation

An experimental evaluation of various embodiments was performed. A configuration as depicted in FIG. 1 was used. A system 310 as depicted in FIG. 3 was used (also referred to herein as "Autoparam"). 3 HP™ Proliant servers were used to host the application components associated with the three-tiered application. One of the application components was a Web server, one was a DB server and another was an Application server. Each tier of the multi-tiered application was hosted in a virtual container on a separate server. Xen-enabled 2.6 Linux kernel in a stock Fedora 4 distribution was used. A fourth host was used to generate client requests to the three-tiered application.

A modified version of the Rice University Bidding system (RUBiS) was used as the test application. It is an online auction benchmark with 22 transaction types providing services such as browsing for items, placing a bid, and viewing user information. In the test bed, the multi-tiered application runs on top of an Apache™ 2.0.55 Web server, a JBoss™ 4.0.2 application server and a MySQL™ database server.

A workload generator was developed to simulate a real world workload instead of using the default RUBiS generator. The workload generator bundled with RUBiS would be unsuitable because it produces only a stationary workload, in the sense that the relative frequencies of the different transaction types remain constant over time, whereas real world workloads are highly non-stationary in terms of transaction mix. The developed workload generator had two features that support much more realistic evaluations than are possible with typical benchmark-like generators. First, the developed generator allows for replaying renamed traces of transactions collected on real production systems; this means that the test workloads contain the same non-stationary behavior of transaction-mix found in production workloads. Second, the developed generator allows mimicking periodicity in real workloads (e.g., diurnal cycles) by varying transaction arrival rates between specified maximum and minimum levels.

The developed workload was derived from a trace of transactions in the "VDR" application, a globally distributed business-critical enterprise application. The VDR transactions were renamed to RUBiS transactions in the following way: First, VDR and RUBiS transactions were separately ranked according to their popularity; for the later, the popularity of transactions in the workload generated by the default RUBiS generator was used. Then each transaction was replaced in the VDR trace with the RUBiS transaction with the same popularity rank to obtain a final renamed trace.

A customized workload generator, driven by a VDR-based trace was used. Client transactions were submitted to the RUBiS application as a Poisson process. For the experimental evaluation, the utilization controllers were located in Dom-0 for each of the three tiers, as it usually is in real products. The feed-forward and feedback controllers were both located at the client side, where the transaction mix and the response times were sampled from the logs of the client. The utilization targets were sent to the three containers through SSH calls. The sampling intervals for the utilization, feed-forward controllers, k, m, and i, were set respectively to 10, 30 and 90 seconds. The parameter P of the utilization controller was set to 1.0. $G^{FB}$ of the feedback controller was set to 0.5.

The results from the Autoparam system were compared with results from four other ways of controlling container size. Those four other ways are as follows:

(1) Fixed entitlement, or abbreviated as "Fixed Ent." Each virtual container was entitled to 0.9 CPU in this case.

(2) Fixed utilization control, or "Fixed Util." The optimal utilization was statically set to 75% in this case.

(3) Feed-forward plus utilization control, or "FF+Util." No feedback compensation was applied for the response time control. The feed-forward control is expected to provide pro-active and fast actions.

(4) Nested control, i.e., feedback performance control plus utilization control, or "FB+Util." Compared with Autoparam, this design does not include the feed-forward part. For simplicity, a standard integrator as described by equation 1 was used for the feedback controller, except that the output of the controller is the utilization target itself instead of delta U.

Table 1 below shows the performance, i.e., the average of the per-interval mean response time across all the intervals in each experiment running for 2 hours. The average CPU entitlement across the three containers is also shown in number of CPUs.

TABLE 1

Experimental Results

| Control Designs (targets) | Mean of MRT (ms) | Total entitlement (# of CPUs) |
|---|---|---|
| Fixed Ent | 204 | 2.7 |
| Fixed Util (75%) | 578 | 0.53 |
| FF + Util (300 ms) | 329 | 0.66 |
| FB + Util (300 ms) | 288 | 0.86 |
| Autoparam (300 ms) | 320 | 0.70 |

As can be seen Autoparam demonstrated a reasonable capacity allocation and achieved a reasonable mean response time.

Various embodiments have been described in various combinations. However, any two or more embodiments may be combined. Further, any embodiment may be used separately from other embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of dynamically resizing a virtual machine container, the method comprising:
   determining a possible size of the virtual machine container within a resource-on-demand environment in accordance with a service level agreement;

determining a corrected optimal utilization based on a desired performance for a multi-tiered application and transaction mix information that describes a mix of transactions that result from executing the multi-tiered application, the determining of the corrected optimal utilization further comprising:
  determining a correction term based on a difference between the desired performance and a measured performance; and
  determining the corrected optimal utilization based on the correction term and an uncorrected optimal utilization, wherein the uncorrected optimal utilization is based at least on service time of transactions, the mix of transactions, and fixed delays;
enabling automatic modification of an amount of a physical resource a virtual machine container is entitled to execute a particular application component associated with the multi-tiered application, wherein the amount of the physical resource is determined based at least in part on a ratio of physical resource consumption and physical resource entitlement, wherein the amount is automatically modified based on the corrected optimal utilization and the possible size of the virtual machine container; and
using the corrected optimal utilization for all of the application components associated with the multi-tiered application.

2. The method as recited by claim 1, further comprising:
determining different optimal utilizations for two or more application components associated with the multi-tiered application.

3. The method as recited by claim 2, wherein the determining of the different optimal utilizations further comprises:
minimizing a cost of resources to determine the different optimal utilizations for the two or more application components.

4. A system for dynamically resizing a virtual machine container, the system comprising:
  a circuit;
  a virtual-machine-container-size-determiner configured to determine a possible size of the virtual machine container within a resource-on-demand environment in accordance with a service level agreement;
  a resizing-virtual-machine-containers-for-a-multi-tiered-application-optimal-utilization-determiner configured for determining a corrected optimal utilization based on a desired performance for a multi-tiered application and transaction mix information that describes a mix of transactions that result from executing the multi-tiered application, wherein the resizing-virtual-machine-containers-for-a-multi-tiered-application-optimal utilization-determiner is a part of a feed-forward controller;
  a feedback controller configured for determining the corrected optimal utilization based on the desired performance, a measured performance, and an uncorrected optimal utilization, wherein the uncorrected optimal utilization is based at least on service time of transactions, the mix of transactions, and fixed delays, ; and
  a virtual-machine-container-for-a-multi-tiered-application-automatic-resouce-allocation-modification-enabler configured for enabling automatic modification of an amount of a physical resource a virtual machine container is entitled to for executing a particular application component associated with the multi-tiered application, wherein the amount is automatically modified based on the optimal utilization and the possible size of tile virtual machine container, and wherein the corrected optimal utilization is used for all of the application components associated with the multi-tiered application.

5. The system of claim 4, further comprising:
a multiple-application-component-optimal-utilization-determiner configured to determine different optimal utilizations for two or more application components associated with the multi-tiered application.

6. The system of claim 4, wherein the physical resource is selected from a group consisting of central processing unit, memory storage, and bandwidth.

7. The system of claim 4, wherein the desired performance is a service level objective from a service level agreement.

8. The system of claim 4, wherein performance is response time for a client that requests transactions with the multi-tiered application.

9. A non-transitory computer readable storage medium having computer-readable program code embedded therein for causing a computer system to perform a method of dynamically resizing a virtual machine container, the method comprising:
  using a queueing model to determine an uncorrected optimal utilization based on a desired performance for a multi-tiered application, transaction mix information that describes a mix of transactions that result from executing a plurality of application components associated with at least the multi-tiered application, service time of transactions, and fixed delays;
  determining a possible size of the virtual machine container within a resource-on-demand environment in accordance with a service level agreement;
  determining a corrected optimal utilization based on a desired application-level performance, a measured application-level performance and the uncorrected optimal utilization;
  enabling automatic modification of an amount of a physical resource that a virtual machine container is entitled to execute a particular application component associated with the multi-tiered application, wherein the amount of the physical resource is determined based at least in part on a ratio of a previous amount of a physical resource that the virtual machine container was consuming over a previous amount of the physical resource that the virtual machine container was entitled to, wherein the amount is automatically modified based on the corrected optimal utilization and the possible size of the virtual machine container; and
  using the corrected optimal utilization for all of the application components associated with the multi-tiered application.

10. The non-transitory computer readable storage medium of claim 9, wherein the computer readable program code embodied therein causes a computer system to perform the method, and wherein the enabling of the automatic modification further comprises:
determining different optimal utilizations for two or more application components associated with the multi-tiered application.

11. The non-transitory computer readable storage medium of claim 9, wherein the determining of the uncorrected optimal utilization is performed by a feed forward controller and the determining of the corrected optimal utilization is performed by a feedback controller.

12. The non-transitory computer readable storage medium of claim 9 wherein the desired performance is a service level objective from a service level agreement.

* * * * *

UNITED STATES PATENT AND TRADEMARK OFFICE
CERTIFICATE OF CORRECTION

PATENT NO.       : 8,566,835 B2                         Page 1 of 1
APPLICATION NO.  : 12/263425
DATED            : October 22, 2013
INVENTOR(S)      : Zhikui Wang et al.

It is certified that error appears in the above-identified patent and that said Letters Patent is hereby corrected as shown below:

In the Claims

In column 11, lines 51-52, in Claim 4, delete "optimal utilization" and insert -- optimal-utilization --, therefor.

In column 11, line 58, in Claim 4, delete "delays, ;" and insert -- delays; --, therefor.

In column 11, line 59, in Claim 4, delete "container" and insert -- containers --, therefor.

In column 11, line 66, in Claim 4, delete "tile" and insert -- the --, therefor.

In column 12, line 61, in Claim 11, delete "feed forward" and insert -- feed-forward --, therefor.

Signed and Sealed this
Twentieth Day of May, 2014

Michelle K. Lee
*Deputy Director of the United States Patent and Trademark Office*